July 2, 1940.  P. A. BRICK  2,206,074
STAKE TRUCK BODY CONSTRUCTION
Filed July 26, 1939
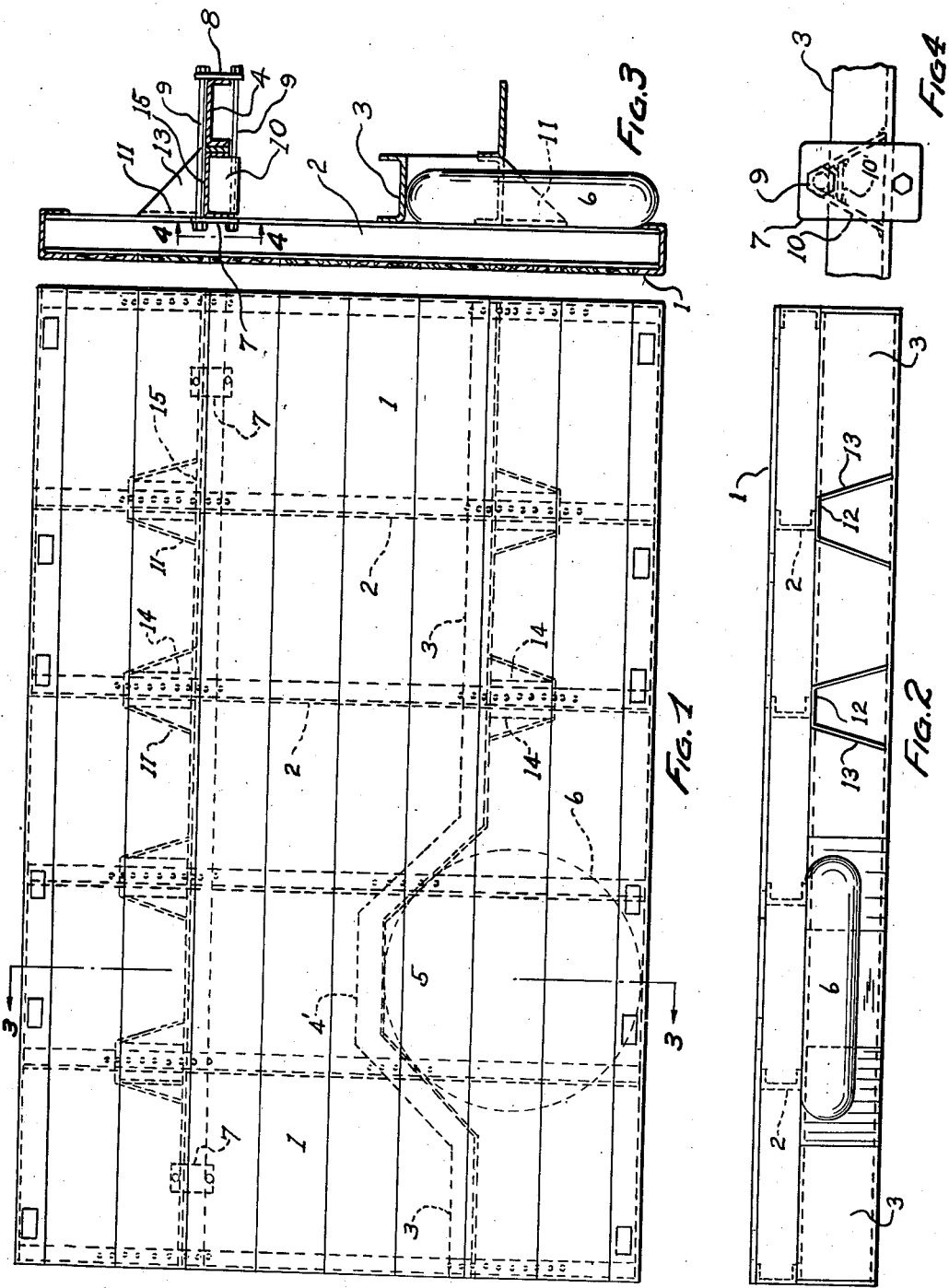
INVENTOR.
Perry A. Brick
BY
Robb & Robb
ATTORNEYS Patented July 2, 1940

2,206,074

UNITED STATES PATENT OFFICE 2,206,074

STAKE TRUCK BODY CONSTRUCTION

Perry A. Brick, Galion, Ohio, assignor to The Perfection Steel Body Company, Galion, Ohio Application July 26, 1939, Serial No. 286,723

1 Claim. (Cl. 296—35)

This invention relates to truck bodies, and more particularly, to improvements in the manner of fastening truck bodies of the stake body type to the truck chassis.

In stake truck bodies providing a large floor area, a considerable portion of the truck body floor overhangs the chassis frame. By reason of the size of the body and the fact that the weight of the load carried by the body is frequently unevenly distributed over the floor of the body, the body is subjected to unusually heavy forces tending to tear the body loose from the chassis. Accordingly, numerous problems have been encountered in providing apparatus which would effectively secure the body to the chassis. Heretofore, the only satisfactory method of supporting the truck body and securing the body to the chassis was to support the body on wooden sills which in turn were secured to the truck chassis.

The principal object of this invention is to provide a stake truck body supported by steel sills with simple and efficient means in the nature of a bracing member for securing the body to the supporting sills, and which will effectively withstand all of the forces encountered by the body.

A further object is to provide novel means for clamping the supporting sills to the chassis which will protect the sill from damage by reason of the clamping force used to secure the sill to the chassis.

Other objects and advantages of the invention will become apparent during the course of the following description.

In the drawing, there is shown a preferred embodiment of the invention.

In this showing:

Figure 1 is a plan view of a truck body constructed in accordance with the principles of this invention.

Figure 2 is a side elevational view of the truck body shown in Figure 1.

Figure 3 is a sectional view taken substantially along the line 3—3 of Figure 1, and illustrating the manner in which the supporting sills are clamped to the truck chassis.

Figure 4 is a plan view of a part of one of the transverse supporting bolsters broken away substantially on the line 4—4 of Figure 3, illustrating the construction of the clamping device.

Referring to Figure 1, the numeral 1 indicates the floor of a stake truck body which is illustrated as being comprised of a plurality of boards extending longitudinally of the truck body and which are suitably secured to transverse supporting bolsters 2. The transverse bolsters 2 are carried by a pair of U-shaped steel channel supporting sills 3. The steel supporting sills 3 are positioned in engagement with and carried by channel members 4 constituting the frame of the truck chassis. The sills 3 are adapted to be clamped or secured to the frame 4 in a manner to be described.

One of the supporting sills 3 is illustrated in Figure 1 as having an offset 4' formed therein by bending the sill to provide a recess 5 toward the front of the truck body. The recess 5 permits the mounting of a spare tire 6 or space for the carrying of other objects at the side of the truck body.

In stake truck bodies using the conventional wooden supporting sills, it is impossible to mount an article such as a spare tire at the side of the truck, without cutting away at least a part of the supporting sill, thereby impairing the strength of the supporting sill. By providing a steel sill 3 and forming it to provide the recess 5, space is provided for the mounting of the spare tire without substantially interfering with the carrying strength of the sill 3.

Referring to Figures 3 and 4, a clamping device comprising clamping members 7 and 8 are provided for securing the supporting sills 3 to the frame 4 of the truck chassis. The member 7 is placed in engagement with the upper surface of the supporting sill 3, and the member 8 is placed in engagement with the under surface of the frame 4. Tie bolts 9 are provided for moving the plates 7 and 8 toward each other to secure the sill 3 to the frame 4.

In order to prevent collapse of the flanges of the supporting sill 3 upon the application of clamping force to the plates 7 and 8, a V-shaped member 10 is inserted between the flanges of the steel supporting sill 3. If desired, the V-shaped member 10 may be provided with a truss member 10' to provide an opening thru which one of the tie-bolts 9 may be passed. The provision of the truss member 10' will effectively position the V-shaped member 10 between the flanges of the supporting sill 3 with respect to the clamping members 7 and 8.

A plurality of bracing members 11 are provided for securing the bolsters 2 to the supporting sills 3 and for bracing the truck body. Each of the bracing members 11 comprises a flat metal plate 12, the upper surface of which is rigidly secured to the undersurface of the transverse bolsters, as best shown in Figs. 1 and 2.

A pair of triangular members 13 are formed integrally with parallel edges 14 of each metal plate 12. Each of the triangular members 13 forms an obtuse angle with its plate 12 and each plate 12 is thereby provided with one triangular member 13 extending forwardly of the truck body and the other triangular member 13 extending rearwardly of the body. The inner edges 15 of each triangular plate 13 are integrally secured as by welding to an adjacent supporting sill 3.

By reason of the shape of the bracing member 11 and the manner in which it is secured to the supporting sills 3, and the transverse bolsters 2, the truck body is able to effectively withstand forces encountered thereby. It will be apparent that the angular members 13 extending in opposite directions longitudinally of the truck and the welding of these members to the supporting sills 3, enables the truck body to withstand the longitudinal forces encountered in the starting and stopping of the truck. Moreover, since the body of the angular members 13 extend transversely of the truck body, it will be apparent that the members 15 also serve to effectively brace the truck body from transverse forces tending to twist or turn the truck body with respect to the frame 4 of the chassis.

The arrangement of the transverse bolsters 2 and the steel supporting sills 3 provides a frame for the stake truck body which may be effectively secured to the frame 4 of the truck chassis. The bracing members 11 enable the bolsters 2 to be rigidly secured to the supporting sills 3 thereby providing a substantially strong and light framework which may be assembled with a minimum of expense and time. The members 11 in a sense brace the truck body in a plurality of directions. That is, the members 11 prevent movement of the bolsters 2 forwardly or rearwardly of the sills 3 and brace the body against forces tending to tilt the bolsters 2 with respect to the sills 3. In addition, the clamping members 7 and 8 together with the tie bolts 9 provide a quick and effective means for securing the body to the truck chassis.

Having thus described my invention, what I claim as new and desire to secure by Letters Patent of the United States, is:

In a stake truck body of the character described, the combination with a chassis frame of, steel supporting sills extending longitudinally of said frame, means securing said sills to said frame, steel bolsters extending transversely of and supported by said sills, floor members secured to the upper surface of said bolsters, and means securing said bolsters to said sills comprising a plurality of flat metal plates, each of said plates being rigidly secured to the underside of one of said bolsters at a point adjacent one of said sills and provided with a pair of triangular bracing members integrally secured to and depending from opposite parallel edges thereof and forming an obtuse angle therewith, each of said triangular bracing members having one of its edges integrally secured to one of said supporting sills whereby said plates and integral bracing members will be effective to withstand longitudinal and transverse forces encountered by said body.

PERRY A. BRICK.